Feb. 1, 1938.  M. P. DE MOTTE ET AL  2,106,970
ACETYLENE GENERATOR
Filed Aug. 14, 1934   2 Sheets-Sheet 1
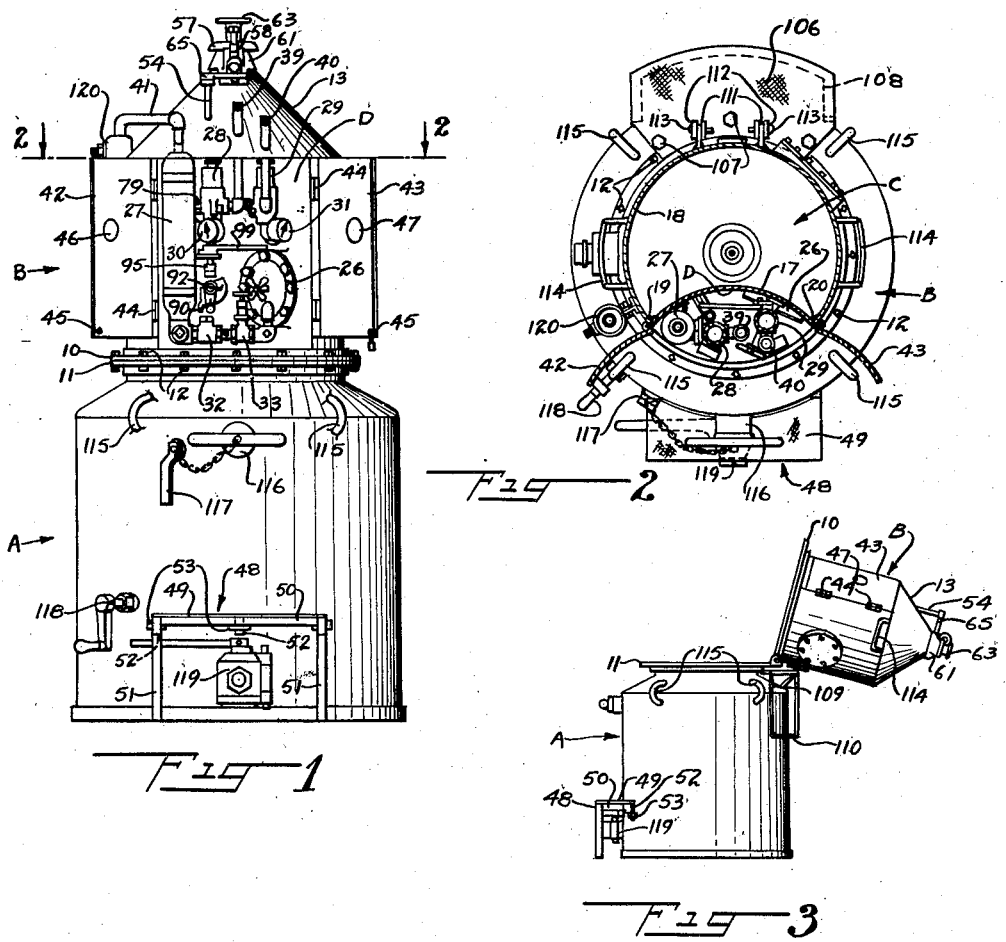
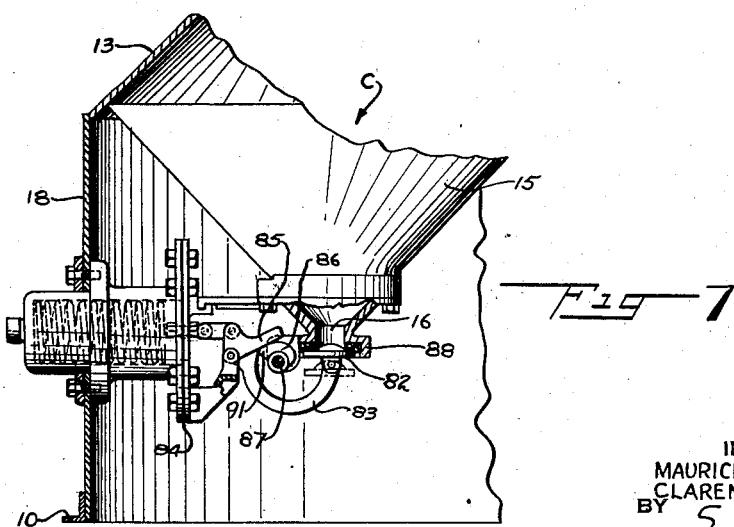
INVENTORS
MAURICE P. DE MOTTE
CLARENCE H. BAKER
BY
ATTORNEY

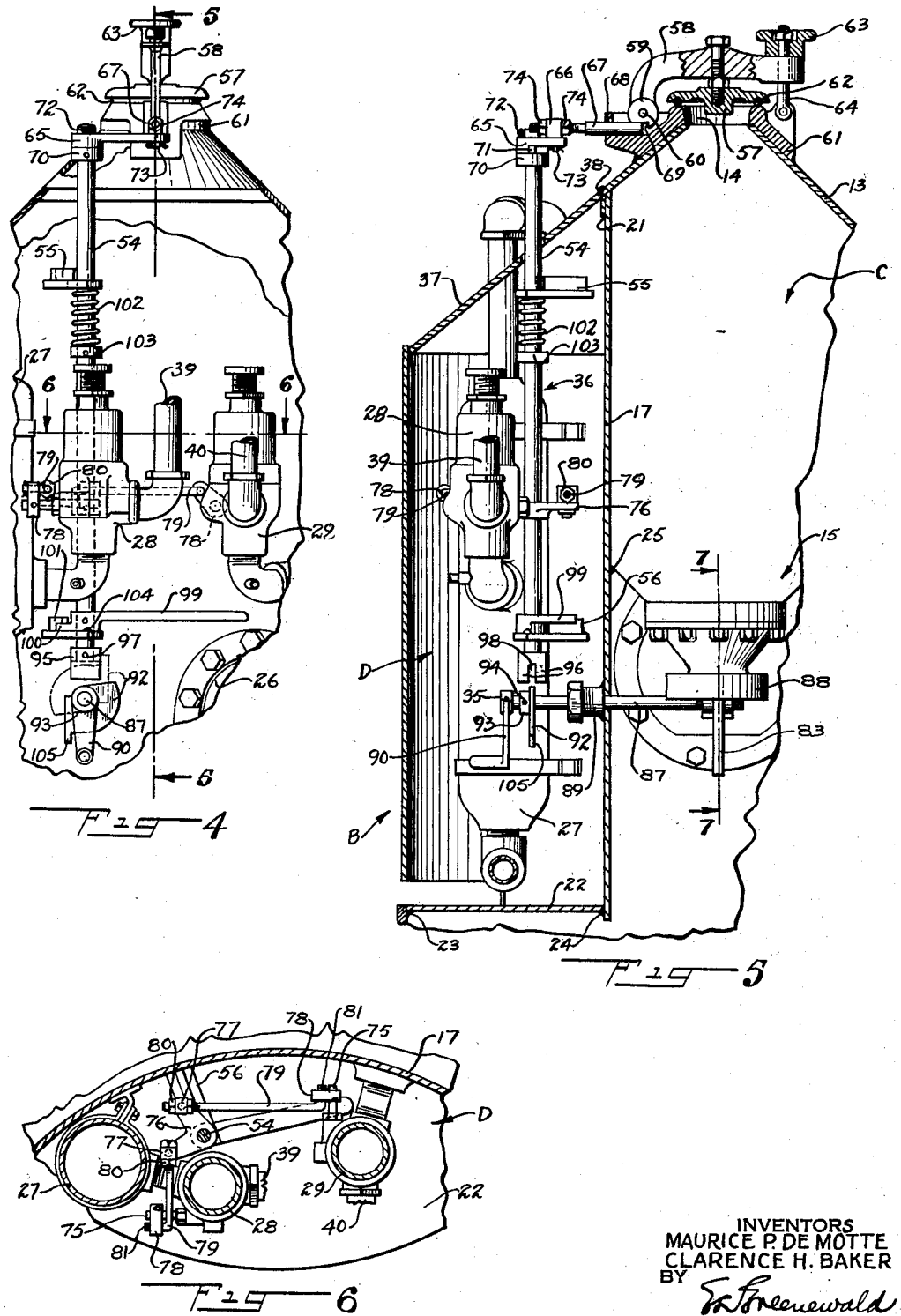

Patented Feb. 1, 1938

2,106,970

UNITED STATES PATENT OFFICE 2,106,970

ACETYLENE GENERATOR

Maurice P. De Motte and Clarence H. Baker, Indianapolis, Ind., assignors, by mesne assignments, to Union Carbide and Carbon Corporation, a corporation of New York Application August 14, 1934, Serial No. 739,731

20 Claims. (Cl. 48—38)

The invention relates to acetylene generators and more particularly to generators of the carbide to water type and to the structure and relative position of the control or auxiliary devices with which the generator is provided.

In generators of this type the accessory equipment is usually located on the outside of the generator, but this location is undesirable because these auxiliary devices are exposed to injury, to the detrimental effects of the weather, especially when such generators are used in open or exposed positions, and to tampering or manipulation by inexperienced or unauthorized persons. Therefore, one of the objects of this invention is to provide a generator of this type having the auxiliary devices or accessory equipment located in a recess or chamber within the general outline of the generator and covered by an openable closure so that the devices are protected from the above mentioned hazards.

It is usually desirable, in generators of this type, to locate the auxiliary equipment at the upper part of the generator adjacent the elements controlled thereby and also above the water in the lower part of the generator. When such generators are relatively large in size, such as the the present generator, it is often difficult for an operator to readily observe and manipulate this auxiliary control equipment. Therefore, another object of this invention is to provide a generator of this type with an operating stand to enable an operator to reach the auxiliary equipment more easily. Another object is to provide such generators with a charging platform suitable for holding an operator and a can of carbide to facilitate charging such generators. Another object is to provide such generators with means to facilitate handling the hopper or upper portion during the process of opening the generator for cleaning or repairing the internal mechanism. Still another object is to provide such generators with interlocking and interference mechanism for controlling movement of the operating and control elements of such generators to provide a sequence of manipulative operations that eliminates the dangers often attending the improper operation of such control devices. These and other new and novel features of the invention will be apparent from the following specification and the accompanying drawings in which:

Fig. 1 is a front view of a generator embodying my invention with the doors open to show the location of the auxiliary equipment.

Fig. 2 is a sectional view of the generator taken along line 2—2 of Fig. 1.

Fig. 3 is a side view of the generator shown in Fig. 1 with the upper portion tipped back to expose the interior mechanism for cleaning or repair.

Fig. 4 is a front fragmentary view of the upper part of the generator illustrated in Fig. 1 with some of the forward parts removed to show the interlocking mechanism.

Fig. 5 is a fragmentary sectional view of the upper part of the generator taken along line 5—5 of Fig. 4.

Fig. 6 is a fragmentary sectional view taken along line 6—6 of Fig. 4 showing that portion of the interlocking mechanism conected with the pressure release valves, and;

Fig. 7 is a fragmentary sectional view taken along line 7—7 of Fig. 5 showing part of the means for manually closing the carbide valve.

The invention as illustrated by the drawings may be embodied in an acetylene generator having a lower water container and base section A and an upper gas container and carbide hopper section B. The sections A and B may be of any convenient or practicable shape or form although a substantially cylindrical contour is preferred, and the upper section B may be somewhat smaller in diameter than the base section A, which may be reduced in diameter at the upper end to conform with the size of the top section. The adjacent portions of the sections A and B may be provided with suitable flanges 10 and 11 which may be secured together by conventional means such as a plurality of bolts 12, and the joint between the flanges may be sealed by a gasket or other equivalent structure which is not shown.

Upper section B may be provided with a conical top 13 having a carbide filling opening 14 at the axial apex, and an inverted conical carbide hopper bottom 15 may be provided in the upper part of this section and secured to any convenient portion such as the lower margin of the top 13 thereby forming a carbide hopper C that may be provided with an axial outlet 16.

In order to provide a location for the accessory equipment where it will be protected, one side such as the front of the upper section B may be provided with a recess or chamber D that extends into or occupies part of the space ordinarily occupied by the carbide hopper and gas chamber and from which it is separated by a wall or partition 17. This partition 17 may be of any convenient shape or form according to the shape of the recess, but preferably it is curved inwardly from side to side between vertical edges which are respectively secured to adjacent edges of an outer shell or side wall 18 of section B by suitable means such as autogenous welds 19 and 20. The upper end of partition 17 may be curved or arched to conform to the shape of the conical top 13 which may be turned down over the edge of the partition and secured by suitable means such as an autogenous weld 21, and the lower end of recess D may be closed by a suitable bottom 22 that conforms to the shape of the opening between the outer shell 18 and the partition 17 to which it is secured by welds 23 and 24. The bottom 15 of carbide hopper C preferably conforms with the contour of partition 17 to which it may be secured by a weld 25 to provide a substantially impervious joint.

Within the recess or chamber D the accessory equipment may be secured in any suitable arrangement according to the size of the parts and their relation to each other and to other portions or parts of the generator. Preferably, this equipment is located within the general outline of the outer wall of section B so that it may be covered or protected by an openable closure that conforms with the general outline of this wall. The accessory equipment or auxiliary control devices may comprise a pressure regulator 26, a flashback arrester 27, one or more gas pressure release valves 28 and 29, one or more pressure gages 30 and 31, one or more control or check valves 32 and 33, a carbide valve closing device 35, and interlocking and interference mechanism 36.

In order to protect the equipment in recess D from weather and tampering, the upper end or top of this chamber may be closed or covered by a canopy 37 that conforms to the general outline or shape of top 13 of section B to which it is secured by suitable means such as a weld 38. This canopy 37 may be provided with suitable passageways for emergent portions of the accessory equipment such as the interference mechanism 36, pressure release valve outlets 39 and 40, and flashback arrester outlet 41 leading to the distributing or service outlet manifold 120. The front of recess D may also be provided with a suitable closure or cover which may be opened when desirable to observe or manipulate the equipment for control or operation of the generator. The closure may be of one or more parts as desired but preferably consists of two doors 42 and 43 each secured to the shell 18 at one side or vertical edge of the recess D by suitable means such as hinges 44. The doors preferably conform in shape with that of the outer shell 18 and also with the general outline of section B, and when closed they may be secured by a suitable latch or similar fastening and also by a lock which may be inserted through suitable openings 45 which are preferably located in the lower margin near the meeting edges. The doors may also be provided with one or more openings such as 46 and 47 through which the pressure gages 30 and 31 may be observed when the doors are closed. Thus, a generator is provided having a recess in which the auxiliary equipment may be located within the general outline of the generator and protected from the usual hazards to which such equipment has heretofore been exposed.

The operation of relatively large generators such as this is often inconvenient or unhandy because it is difficult for an operator to reach the controls, so to facilitate operation, the generator may be provided with an operating stand such as 48 that is secured to the generator, preferably at a suitable height below the recess D. The stand may be rigidly secured to the generator although for purpose of shipment a detachable stand is preferable, and it may consist of a non-skid tread plate 49 that conforms to the shape of the outer surface of the generator, and the outer margin may be reinforced by suitable means such as an angle iron 50 secured to the plate by conventional fastening such as welds. The stand may be secured to the generator by any suitable means but preferably it is provided with a suitable number such as three depending ears 52 that removably fit in a like number of respective openings between the outer surface of the generator and three straps such as 53 secured thereto by welds, and the stand may also be provided with additional supports or braces such as legs 51 to support the outer portion.

Before the generator is opened to fill the hopper with carbide, the gas in the generator should be released and conducted away where it will not be a hazard, and the carbide feeding means should be rendered inoperative so that gas will not be generated while the generator is open as such gas would constitute both a hazard and a waste. In order to obviate such hazards and promote safety the generator may be provided with an interlocking mechanism to insure operation of the various control devices in a predetermined sequence, and in general this interlocking mechanism prevents the carbide filling device from being opened until the carbide feeding mechanism has been rendered inoperative and the gas release device or devices have been opened, and the carbide feeding mechanism from being rendered operative until the carbide filling device and gas release device or devices have been closed.

The interference mechanism may comprise a vertical shaft 54 and means for operatively connecting such shaft to the operative elements of the generator. Preferably the shaft 54 is located within the recess D and it may be supported or journaled in vertically aligned openings in the outer respective ends of two or more supports such as 55 and 56 which are secured to the outer surface of partition 17 by suitable means such as welds. This interference mechanism may be connected with the carbide filling means which comprises the carbide filling opening 14 that may be provided with any suitable cover such as 57. To avoid misplacement or loss this cover may be carried by a strap 58 having a hub 59 rotatably carried by a shaft 60 which is secured in suitable openings in a casing 61 surrounding opening 14 and forming a seat for gasket 62 upon which the cover 57 may be clamped by a nut 63 threaded on a clamp bolt 64 hinged to casing 61 and located in a suitable slot in the free end of strap 58. The operative connection between shaft 54 and cover 57 may consist of an arm 65 secured to shaft 54 and carrying a swivel block 66 in which is secured a locking bar 67 that slides in a fixed bearing 68 in casing 61. Hub 59 of strap 58 is provided with a slot 69 in which locking bar or bolt 67 may slide when cover 57 is closed and tightly clamped on casing 61, and the slot 69 is so located that the locking bar 67 must be withdrawn therefrom before cover 57 can be released and opened. The arm 65 may be secured or keyed directly to shaft 54 although it is desirable to facilitate its removal by securing the arm 65 on shaft 54 between a collar 70, rigidly secured or keyed on shaft 54 and having one or more teeth or projections 71 that fit in a like number of cooperating recesses in the arm, and means such as a cotter pin 72 that may be readily removed to release the arm from the shaft. The swivel block 66 may be secured to arm 65 by a portion 73 that extends through an opening in the outer end of the arm and is held against displacement by a suitable retainer such as a cotter pin, and the upper end of the swivel block may be provided with an opening in which the threaded outer end of the locking bar 67 is adjustably secured by means of one or more jam nuts 74.

The interference mechanism may also be connected with the gas release means. Each of the release valves 28 and 29 is provided with a protruding shaft or spindle 75 that may be manually rotated to move the valve to open position, and the cooperative connection between the release valves and shaft 54 may comprise a bell crank 76 rigidly secured to shaft 54, a swivel block 77 rotatively mounted in the outer end of each arm of bell crank 76, an arm 78 having one end rigidly secured upon each spindle 75 and the other end provided with an opening in which one end of a link 79 is secured which is also adjustably secured in an opening in one of the swivel blocks 77 by one or more jam nuts 80. The end of each link 79 within the opening in each arm 78 may be at a right angle to the rest of the link, and each link may be secured in its associated arm 78 by retaining means such as a cotter pin 81 in an opening in the protruding end of the link. The opposite end of each link 79 may be threaded in the opening in its associated swivel block and secured by a single jam nut, but for convenience of adjustment the swivel block may be provided with a plain opening in which the threaded end of one of the links is secured by a jam nut on the link each side of the block.

The interference or interlocking mechanism may also be operatively connected with the carbide feeding mechanism. This feeding mechanism may consist of an outlet opening 16 at the bottom of carbide hopper C from which the flow of feeding carbide is controlled by a valve 82 carried by a pivoted arm 83 operatively connected to a pressure responsive diaphragm 84 that opens and closes the carbide feed valve 82 according to the pressure within the generator in a manner well known in the art. The carbide valve operating arm 83 is provided with a valve closing arm 85 located in operative relation to a sector 86 rigidly secured on a substantially horizontal valve closing shaft 87 that is journaled in hopper outlet casting 88 and extends outward through partition 17, and a stuffing box 89 rigidly secured or welded thereto, into recess D substantially in vertical alignment with shaft 54 and preferably a short distance below the lower end thereof. The outer end of shaft 87 may be provided with a handle 90 to facilitate manual operation and the cam 86 may be provided with a stop such as outward projection 91 that engages arm 85 and arrests the closing movement of the carbide valve closing means when the carbide valve 82 is in closed or locked position.

The interlocking connection between shafts 54 and 87 may include eccentric mechanism such as a cam or sector movable with one of the shafts and tumbler mechanism such as a slotted or forked member or a member having one or more offset ends movable with the other shaft. Although either mechanism may be connected with either shaft, for convenience of arrangement and operation it is desirable to secure the sector to shaft 87 and the tumbler to shaft 54.

More specifically this portion of the interlocking mechanism may comprise a sector 92 having a suitable hub 93 rigidly secured to shaft 87 by conventional means such as cotter, key or pin 94, and a tumbler 95 having one or more offset end portions 96 rigidly secured to the lower end of shaft 54 by conventional means such as a pin 97. Preferably the tumbler 95 is forked and provided with two offset or eccentric end portions 96 having a space or slot 98 therebetween of suitable width to freely receive the sector 92. The end portions 96 may be of any suitable cross sectional shape or form although rectangular is preferred, and these end portions may also be of equal length with flat or plane ends at substantially a right angle to the axis of shaft 54. The relative position of this portion of the interference mechanism is preferably one in which the sector 92 is within the slot 98 when the carbide feed valve is open, the pressure release valves are closed and the carbide filling opening locked. With the parts in this position sector 92 is interlocked with tumbler 95 and holds shaft 54 against movement to a position wherein the carbide filling opening cover 57 is unlocked and the release valves 28 and 29 are open. When shaft 87 is rotated to a position wherein carbide feed valve 82 is closed, sector 92 is also rotated to a position where it is out of slot 98 and out of the path of operative movement of offset members 96, and then shaft 54 may be rotated to a position where the carbide filling cover is unlocked and the release valves are open. In this position slot 98 is out of alignment with sector 92, and opening of the carbide valve is prevented by engagement between the sector 92 and projections 96. The valve opening movement of shaft 87 may also be limited by providing sector 92 with a stop such as projection 105 that strikes against the side of interlocking member 95 and arrests the opening movement when sector 92 is in slot 98 and carbide valve 82 is open.

When the generator is moved or not operated for some time it may be desirable to close the carbide feed valve, and at such times it is desirable to prevent movement or rotation of shaft 54 from its normal or operative position in which the generator is operative. Also, shaft 54 may be provided with means to facilitate manual operation such as a handle 99 rigidly secured thereon adjacent and preferably above and in contact with one of the supports such as 56 to limit downward movement of the shaft. The handle 99 may be provided with one or more stops such as projection 100 which cooperate with a portion of the support 56 such as web 101 to limit the range of travel in one or more directions. Accidental movement of shaft 54 may be obviated by providing it with means for increasing the friction thereof during movement. This means may include a helical or coiled spring 102 surrounding the shaft in partially compressed condition between the under side of support 55 and the upper surface of a collar 103 rigidly secured to the shaft below the support. This spring increases the tension or pressure between handle 99 and support 56 and consequently increases the friction of the shaft during movement. Accidental movement may be further obviated by providing the shaft with a frictional latch such as a detent or rigid projection 104 on the upper surface of support 56 that cooperates with an indentation or groove of corresponding shape in the lower surface or bottom of handle 99. When the shaft 54 is moved from operating position sufficient force must be applied to raise the entire shaft against the pressure of spring 102 and disengage projection 104 from its cooperating groove, and the resistance of the shaft against such movement is sufficient to ordinarily detain it in operating position.

Generators of relatively large size such as this are frequently difficult to recharge with carbide because it is inconvenient for an operator to reach the carbide filling opening when standing on the floor beside the generator. The recharging operation may be facilitated by providing the generator with a charging platform located so that an operator may readily reach the filling opening when standing thereon, and of sufficient size and strength to safely support both an operator and a one hundred pound can of carbide. This platform may consist of a non-skid tread plate 106 of suitable size and shape secured near the top of the back side of lower section A by conventional means such as a suitable number of bolts 107. This platform may be suitably reinforced by a frame 108 and braced by brackets 109 when necessary, and it may also be provided with a depending step 110 to assist an operator in mounting the platform.

The operation of opening relatively large generators such as this for inspection, cleaning, or adjustment, is often difficult due to the heaviness of the component parts. This operation may be facilitated by providing the component sections A and B with connecting hinges so that the upper section B may be laid over onto the charging platform 106 when open as shown in Fig. 3. The hinges may consist of suitable hinge parts 111 and 112 respectively secured or welded to flanges 10 and 11 of the sections A and B, and provided with aligned openings in which hinge pins or bolts 113 are suitably secured. The hinge pins are preferably somewhat smaller than the openings in the hinges to provide relative movement between the hinge sections so that there is no strain on the hinges when the generator is closed. The upper section B may be provided with one or more handles such as 114, and the lower section A may be provided with one or more handles such as 115 to further facilitate handling the complete generator as well as the component parts. In addition to the novel features and elements already described the generator may be provided with conventional elements such as a water filling opening 116, an overflow fitting 117, a sludge agitator 118, and a residue outlet gate 119.

When the generator is in condition for operation the lower section B contains a suitable amount of water and the carbide hopper C contains granular carbide of a size suitable to feed through the hopper outlet 16. To start operation, handle 90 is rotated about a half revolution and this movement disengages sector 86 from the arm 85 of carbide valve support 83 and allows the carbide feed valve 82 to open. As the valve opens it allows carbide to feed from the hopper into the water in the bottom of the generator and generate acetylene gas which accumulates in the gas chamber above the water and raises the pressure within the generator. When the pressure reaches a predetermined value it moves the diaphragm 84 and closes the carbide feed valve 82, and when the pressure is reduced by withdrawal of gas the diaphragm moves in the opposite direction and opens the carbide feed valve. In this manner the carbide feeding device maintains a substantially uniform pressure within the generator. The gas withdrawn from the generator passes through pressure regulator 26, control valve 33, check valve 32, flashback arrester 27, and distributing manifold 120 to which suitable hose lines or other conduits may be attached.

The present invention is not limited to the exact structure and arrangement shown but embraces operatively similar and equivalent elements and features having a different relative arrangement, and the particular features shown as an example of a preferred embodiment of the invention may be of different form and relative arrangement without departing from the spirit of the invention or the scope of the claims.

This application is closely related to copending applications of Maurice P. De Motte, Serial No. 738,099, filed August 2, 1934, and Serial No. 759,515, filed December 28, 1934.

We claim:

1. An acetylene generator comprising an outer wall forming a gas chamber, said wall having a recess in one side thereof forming another chamber outside of said gas chamber and accessible from the exterior of said generator; and generator and gas control devices secured in said recess within the general outline of said wall.

2. An acetylene generator comprising an outer wall forming a gas chamber, said wall provided with an outwardly facing recess in one side thereof forming another chamber outside of said gas chamber and accessible from the exterior of said generator; generator and gas control devices secured in said recess within the general outline of said wall; and an openable closure for said recess.

3. An acetylene generator comprising a gas chamber having an outer wall of substantially cylindrical outline; a carbide hopper within said gas chamber; said generator having a recess for generator control devices outside of, and extending into said gas chamber and into said carbide hopper but separated therefrom by a wall; and an openable closure for said recess having a surface coinciding with the same general form of the outer wall of said gas chamber.

4. An acetylene generator comprising a gas chamber having an outer wall of substantially cylindrical outline; a substantially coaxial carbide hopper within said gas chamber; an inwardly curved partition extending into said gas chamber and said carbide hopper and forming a recess outside of said gas chamber for generator control devices; and a closure for said recess including one or more openable doors having the same general outline as the outer wall of said gas chamber.

5. An acetylene generator comprising a substantially cylindrical water chamber; a substantially cylindrical gas chamber above said water chamber; a generally conical carbide hopper within said gas chamber and substantially coaxial therewith; said gas chamber and said carbide hopper having a recess in one side thereof forming another chamber outside of said chamber and hopper for generator control devices; and a closure for said recess having a surface coinciding with the general form of the outer wall of said gas chamber that may be opened during the operation of said generator for manipulation of said control devices.

6. An acetylene generator comprising a water chamber having a substantially cylindrical wall;

a gas chamber above said water chamber having a substantially cylindrical wall somewhat smaller in diameter than that of said water chamber; a substantially conical carbide hopper within said gas chamber; a substantially conical top on said gas chamber; an inwardly curved partition in one side of said gas chamber and said hopper forming a substantially gas tight joint with said top, said carbide hopper, and the wall of said gas chamber to form a recess therein; a substantially gas tight closure at the bottom of the recess; a conical canopy over the top of said recess having the same general outline as the top of said gas chamber; and a closure for said recess including one or more doors that may be opened during the operation of said generator to manipulate the generator control devices located in said recess.

7. In an acetylene generator; a manually rotatable carbide feed valve locking device; a carbide filler lock and gas release interconnecting device; and means for controlling the movement of each of said devices by the position of the other device including a sector movable with one of said devices in cooperative relation with a tumbler movable with the other said device.

8. In an acetylene generator; a carbide feed valve locking device including a manually rotatable member; a carbide filler lock and gas release device including a manually rotatable member; and interlocking means for controlling the movement of each member by the position of the other including a sector rigidly secured to said first mentioned member in cooperative relation with a slot in a tumbler rigidly secured to said second mentioned member.

9. In an acetylene generator of the carbide to water type; a carbide feed locking device including a manually rotatable horizontal shaft; a carbide filler lock and gas release device including a manually rotatable vertical shaft; and means for controlling the movement of each shaft by the position of the other shaft including an outwardly projecting member secured to one of said shafts in operative relation with a slot in the end of a cooperating member secured to the end of the other said shaft.

10. In an acetylene generator of the carbide to water type; generator control means comprising a substantially horizontal shaft and a substantially vertical shaft substantially in vertical alignment with said horizontal shaft; interlocking means for controlling the operation of each of said shafts by the position of the other shaft including a sector secured to said horizontal shaft substantially in alignment with said vertical shaft, and a tumbler secured to said vertical shaft having a slot in the end thereof in alignment with said sector.

11. An acetylene generator comprising a carbide hopper; a filling opening for said hopper having a closure; a lock for said closure; a carbide feed valve at the outlet of said hopper; said generator having a recess in the side thereof; means for closing said feed valve including a horizontal shaft extending into said recess; gas release means in said recess; generator control means including a vertical shaft suitably supported in said recess and operatively connected with said lock and said gas release means; and means within said recess for controlling the sequence of operative movement of said shafts comprising a sector secured to said horizontal shaft in operative relation with a slot in a member secured to said vertical shaft that holds said vertical shaft against movement when said sector is within said slot, and holds said horizontal shaft against operative movement when said slot is out of alignment with said sector.

12. In an acetylene generator of the carbide to water type; a carbide feed valve; means comprising an arm for operatively supporting said valve; means for closing said valve comprising a sector in operative relation with said arm; a shaft operatively connected with said sector; generator control means comprising a rotatable member; interlocking means between said member and said shaft comprising a sector movable with said shaft; and means on said first mentioned sector for cooperating with said arm to limit the rotative movement of said shaft in one direction, and means on said second mentioned sector for cooperating with said member to limit the rotative movement of said shaft in another direction.

13. In an acetylene generator; a plurality of generator control devices; means for controlling the operation of said devices comprising a rotatable shaft; a plurality of supports having aligned openings in which said shaft is journaled; means for manually operating said shaft comprising a handle rigidly secured thereto in contact with one of said supports; and means for resisting accidental movement of said shaft comprising a partially compressed spring secured on said shaft between one of said supports and a collar rigidly secured to said shaft.

14. In an acetylene generator; a plurality of generator control devices; means for controlling the operation of said devices comprising a rotatable shaft; a plurality of supports having aligned openings in which said shaft is journaled; means for manually operating said shaft comprising a handle secured thereon in contact with one of said supports; means for detaining said shaft in operative position comprising a projection on one of said supports within a corresponding groove in said handle; and means resisting separation of said projection and said groove comprising a partially compressed spring secured on said shaft between one of said supports and a collar secured on said shaft.

15. An acetylene generator comprising a lower portion in operative relation to an upper portion; a charging platform rigidly secured to said lower portion; and means to facilitate opening said generator comprising a plurality of hinges operatively connecting said portions adjacent said platform so that said upper portion will rest on said platform when swung to open position.

16. An acetylene generator comprising means, including a vertical tubular side wall, enclosing a gas chamber; said side wall having a portion thereof extending inwardly relatively to the remainder of said wall, such inwardly extending portion providing a recess outside of the gas chamber and accessible from the outside of said generator; and gas control devices mounted in said recess within the continuity of said remainder of said wall.

17. An acetylene generator comprising means, including a vertical tubular side wall, enclosing a gas chamber; said side wall having a portion thereof extending inwardly relatively to the remainder of said wall, such inwardly extending portion providing a recess outside of said chamber and accessible from the outside of said generator; gas control devices mounted in said recess within the continuity of said remainder of said wall, and an openable closure for said recess, said closure being adapted to constitute a continuation of said remainder of said wall.

18. An acetylene generator comprising a bottom section adapted to contain water; a top section constituting a gas chamber, the side wall of said top section having a recess accessible from the outside of said generator; a carbide hopper and carbide feed control mechanism housed within said top section; gas delivery control means mounted in said recess and communicating with said chamber; and a hinge pivotally connecting said top section to said bottom section, whereby said top section may be swung about said hinge to open said generator and expose said hopper and mechanism for inspection and repair.

19. An acetylene generator as claimed in claim 18, in which said recess and said hinge are located at opposite sides of said generator; and an openable closure for said recess is mounted on said top section.

20. An acetylene generator comprising a base section adapted to contain water and having an opening at its upper end; a top section having an opening at its lower end; a partition dividing said top section into two compartments, one of said compartments constituting a gas collecting chamber and containing a hopper adapted to contain calcium carbide; gas control means mounted in the other of said compartments and communicating through said partition with said gas collecting chamber; means for detachably securing said sections together in gas-tight relation with their open ends in registry; and mechanism for feeding carbide from said hopper through such registering open ends into water in said base section.

MAURICE P. DE MOTTE.
CLARENCE H. BAKER.